US008881853B2

(12) United States Patent
    Nitawaki

(10) Patent No.: US 8,881,853 B2
(45) Date of Patent: Nov. 11, 2014

(54) BATTERY PACK MOUNTING STRUCTURE FOR ELECTRIC CAR

(71) Applicant: Suzuki Motor Corporation, Shizuoka-ken (JP)

(72) Inventor: Kunihiro Nitawaki, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 22 days.

(21) Appl. No.: 13/753,151

(22) Filed: Jan. 29, 2013

(65) Prior Publication Data

US 2013/0248267 A1    Sep. 26, 2013

(30) Foreign Application Priority Data

Mar. 26, 2012 (JP) ................. 2012-068587

(51) Int. Cl.
    *B60K 1/04*        (2006.01)
(52) U.S. Cl.
    CPC ........... *B60K 1/04* (2013.01); *B60K 2001/0416* (2013.01); *B60K 2001/0438* (2013.01)
    USPC .......................................... 180/68.5; 280/782
(58) Field of Classification Search
    USPC ......... 180/65.1, 68.3, 68.5, 60; 280/781, 782, 280/783, 784, 785, 786, 124.109; 429/100
    See application file for complete search history.

(56) References Cited

U.S. PATENT DOCUMENTS

| 5,392,873 | A  | * | 2/1995  | Masuyama et al. | 180/68.5 |
| 6,431,300 | B1 | * | 8/2002  | Iwase           | 180/68.5 |
| 7,051,825 | B2 | * | 5/2006  | Masui et al.    | 180/68.5 |
| 7,144,039 | B2 | * | 12/2006 | Kawasaki et al. | 280/784  |
| 7,503,585 | B2 | * | 3/2009  | Hashimura et al.| 280/782  |
| 7,690,686 | B2 | * | 4/2010  | Hashimura et al.| 280/782  |
| 7,886,861 | B2 | * | 2/2011  | Nozaki et al.   | 180/232  |
| 7,921,951 | B2 | * | 4/2011  | Watanabe et al. | 180/68.5 |
| 8,037,960 | B2 | * | 10/2011 | Kiya            | 180/68.5 |
| 8,347,995 | B2 | * | 1/2013  | Fernandez-Mateo | 180/68.5 |
| 2001/0030069 | A1 | * | 10/2001 | Misu et al.   | 180/68.1 |
| 2002/0157886 | A1 | * | 10/2002 | Iwase         | 180/68.5 |
| 2003/0098191 | A1 | * | 5/2003  | Takedomi et al. | 180/68.5 |
| 2003/0186115 | A1 | * | 10/2003 | Shibasawa et al. | 429/100 |
| 2004/0079569 | A1 | * | 4/2004  | Awakawa       | 180/68.5 |
| 2007/0215399 | A1 | * | 9/2007  | Watanabe et al. | 180/68.5 |
| 2008/0196957 | A1 | * | 8/2008  | Koike et al.  | 180/68.5 |
| 2008/0315572 | A1 | * | 12/2008 | Hashimura et al. | 280/782 |
| 2011/0139527 | A1 | * | 6/2011  | Bannier et al. | 180/68.5 |

FOREIGN PATENT DOCUMENTS

JP        2004-161158        6/2004

* cited by examiner

*Primary Examiner* — J. Allen Shriver, II
*Assistant Examiner* — Bridget Avery
(74) *Attorney, Agent, or Firm* — Alston & Bird LLP

(57) ABSTRACT

A battery pack mounting structure for electric cars in which a pair of rear side members having a front portion, a rear portion, and a rising portion are arranged at both vehicle-widthwise side portions, intermediate portions of the respective rear side members are coupled to each other by a cross member, and a battery pack is mounted on a vehicle body by a sub-frame that is coupled to the respective rear side members and the cross member, wherein the cross member is arranged at a position below a bent portion that connects the rising portion and the rear portion of each of the rear side members, the sub-frame includes a ring-like support frame that extends in a horizontal direction and surrounds an outer periphery of the battery pack, and a front side portion and both vehicle-widthwise side portions of the support frame are respectively coupled to the cross member and the rear portions of the respective rear side members by coupling portions.

2 Claims, 3 Drawing Sheets

BATTERY PACK MOUNTING STRUCTURE FOR ELECTRIC CAR

CROSS-REFERENCE TO RELATED APPLICATIONS

The present application claims priority to Japanese Patent Application No. 2012-068587 filed Mar. 26, 2012, the content of which is incorporated by reference herein its entirety.

BACKGROUND OF THE INVENTION

1. Field of the Invention

The present invention relates to a battery pack mounting structure for electric cars, and more particularly, relates to a battery pack mounting structure for electric cars for use to protect a battery pack mounted on an electric car which runs by a motor driving force from an impact force in the event of a rear impact.

2. Description of Related Art

Electric cars which run by a motor driving force need to have a larger battery capacity so as to run longer distances. At this point, when the battery capacity increases, a larger and heavier battery pack is required to store a battery. Thus, the battery pack is often mounted in a lower portion of a vehicle or a rear portion of the vehicle.

As a conventional battery pack mounting structure for electric cars, Japanese Patent Laid-Open No. 2004-161158 discloses a structure in which a plurality of battery packs are mounted in a longitudinal direction on the lower side of a rear floor, wherein a battery pack on the front side is mounted at a lower height above the ground than a battery pack on the rear side.

In the publication, a mount frame for mounting the battery packs on a vehicle body is composed of a front portion that extends in the vehicle longitudinal direction, a rear portion that is arranged at a position above the front portion and extends in the vehicle longitudinal direction, and a rising portion that connects both portions and extends in a vehicle vertical direction, and is formed in a step-like shape in side view such that the front portion having a front-side battery mounting surface is located at a lower height above the ground than the rear portion having a rear-side battery mounting surface.

SUMMARY OF THE INVENTION

In the above publication, however, since the mount frame for mounting the battery packs on the vehicle body is bent in the vehicle vertical direction at a vehicle-longitudinal intermediate portion, the mount frame is deformed in the vehicle vertical direction when an impact force is applied from the vehicle rear side in the event of a vehicle rear impact. Thus, in the battery pack mounting structure according to the above publication, the battery pack is difficult to sufficiently protect by the mount frame.

Also, in the above publication, while both vehicle-widthwise end portions of the mount frame are coupled to a pair of rear side members that extend in the vehicle longitudinal direction, the rear side members include a rising portion that extends upward at a vehicle-longitudinal intermediate portion. Thus, when an impact force is applied from the vehicle rear side, a rear portion of the rising portion is deformed so as to project to the vehicle upper side, so that the longitudinal length is reduced. Accordingly, in the battery pack mounting structure according to the above publication, there is a risk that the battery pack moves toward the vehicle front side so as to come into contact with another in-vehicle part.

It is an object of the present invention to protect a battery pack in the event of a vehicle rear impact in an electric car in which the battery pack is arranged between rear side members arranged at a vehicle rear portion.

The present invention provides a battery pack mounting structure for electric cars in which a pair of rear side members extending in a vehicle longitudinal direction and having a front portion, a rear portion that is arranged at a position above the front portion, and a rising portion that connects both portions are arranged at both vehicle-widthwise side portions, intermediate portions of the respective rear side members are coupled to each other by a cross member that extends in a vehicle width direction, and a battery pack is mounted on a vehicle body by a sub-frame that is coupled to the respective rear side members and the cross member, wherein the cross member is arranged at a position below a bent portion that connects the rising portion and the rear portion of each of the rear side members, the sub-frame includes a ring-like support frame that extends in a horizontal direction and surrounds an outer periphery of the battery pack, and a front side portion and both vehicle-widthwise side portions of the support frame are respectively coupled to the cross member and the rear portions of the respective rear side members by coupling portions.

In the present invention, the sub-frame for mounting the battery pack on the vehicle body includes the ring-like support frame that extends in the horizontal direction and surrounds the outer periphery of the battery pack. Thus, since the sub-frame does not include a vertical bent portion, the sub-frame can be formed into such a shape that is difficult to bend in a vehicle vertical direction and difficult to compress in the vehicle-longitudinal length when an impact force is applied to the sub-frame in the vehicle longitudinal direction.

Since the front side portion of the support frame is coupled to the cross member by the coupling portion, the sub-frame transmits a forward force acting on the support frame to the cross member arranged at a position below the bent portions that connect the rising portions and the rear portions of the rear side members, and can thereby suppress deformation of the rear side members at the bent portions when an impact force is applied from the vehicle rear side.

Also, in the sub-frame, since the both vehicle-widthwise side portions of the support frame are coupled to the rear portions of the rear side members by the coupling portions, the rear side members can be reinforced by the support frame, and the rear side members can be thereby prevented from being bent in the vehicle vertical direction when receiving a force in the vehicle longitudinal direction.

Thus, the rear side members are deformed at the bent portions that connect the rising portions and the rear portions in the event of a vehicle rear impact, so that the battery pack can be prevented from colliding with an in-vehicle part arranged in front thereof.

Therefore, in the present invention, the battery pack can be protected in the event of a vehicle rear impact in the electric car in which the battery pack is arranged between the rear side members arranged at a vehicle rear portion.

DETAILED DESCRIPTION

In the following, an embodiment of the present invention will be described based on the drawings.

Figure 1:
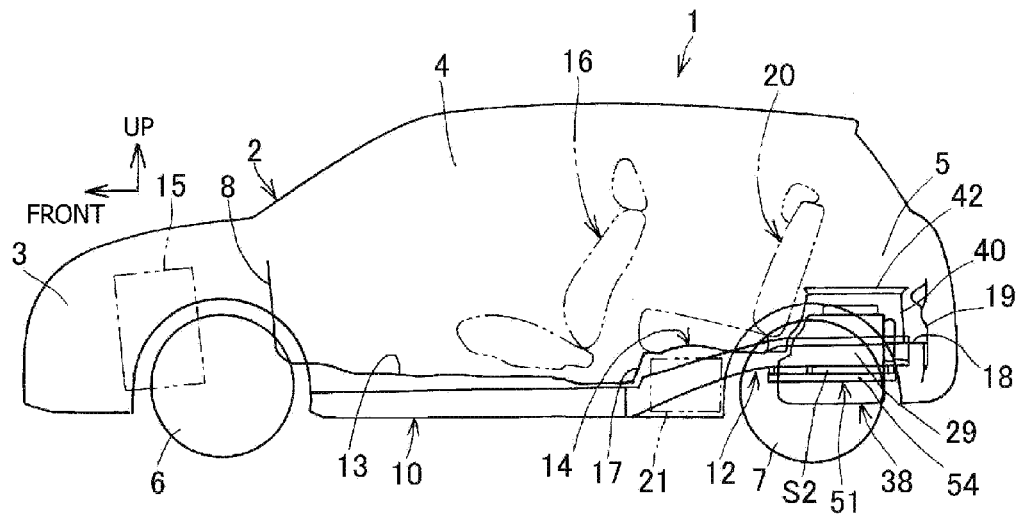
FIG. 1 is a side view of an electric car (embodiment)
Figure 2:
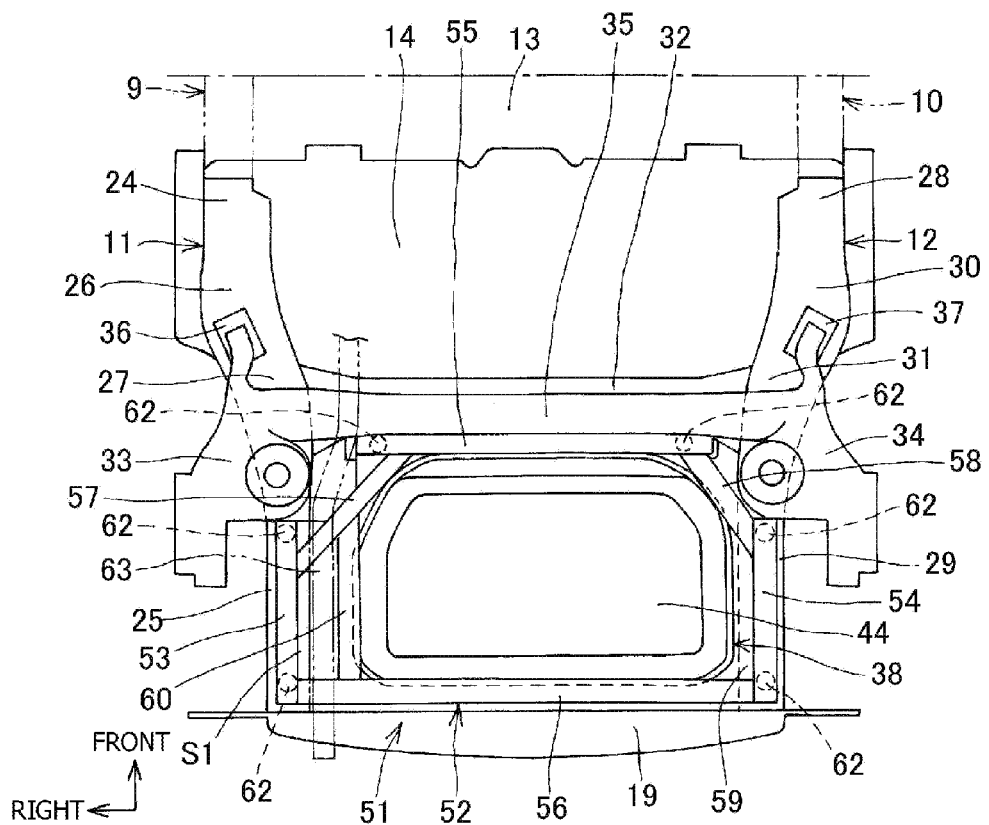
FIG. 2 is a bottom view of a vehicle rear portion of the electric car (embodiment)

FIGS. 1 to 5 show the embodiment of the present invention. In FIG. 1, reference numeral 1 denotes an electric car, 2 a vehicle body, 3 an engine compartment, 4 a vehicle interior, 5 a trunk, 6 a front wheel, and 7 a rear wheel. In the electric car 1, a dash panel 8 that extends in a vehicle width direction is arranged at a front portion of the vehicle body 2. In the electric car 1, a pair of front side members 9 and 10 that extend in a vehicle longitudinal direction are arranged at both widthwise side portions of a center portion of the vehicle body 2, and a pair of rear side members 11 and 12 that extend in the vehicle longitudinal direction are arranged at both widthwise side portions of a rear portion of the vehicle body 2 as shown in FIG. 2.

The engine compartment 3 is formed on the front side of the dash panel 8 at the front portion of the vehicle body 2. A front floor panel 13 is attached to the pair of front side members 9 and 10 at the center portion of the vehicle body 2, and the vehicle interior 4 is formed at an upper portion of the front floor panel 13. A rear floor panel 14 connected to the front floor panel 13 is attached to the pair of rear side members 11 and 12 at the rear portion of the vehicle body 2, and a portion of the vehicle interior 4 is formed at a front-side upper portion and the trunk 5 is formed at a rear-side upper portion of the rear floor panel 14.

Figure 3:
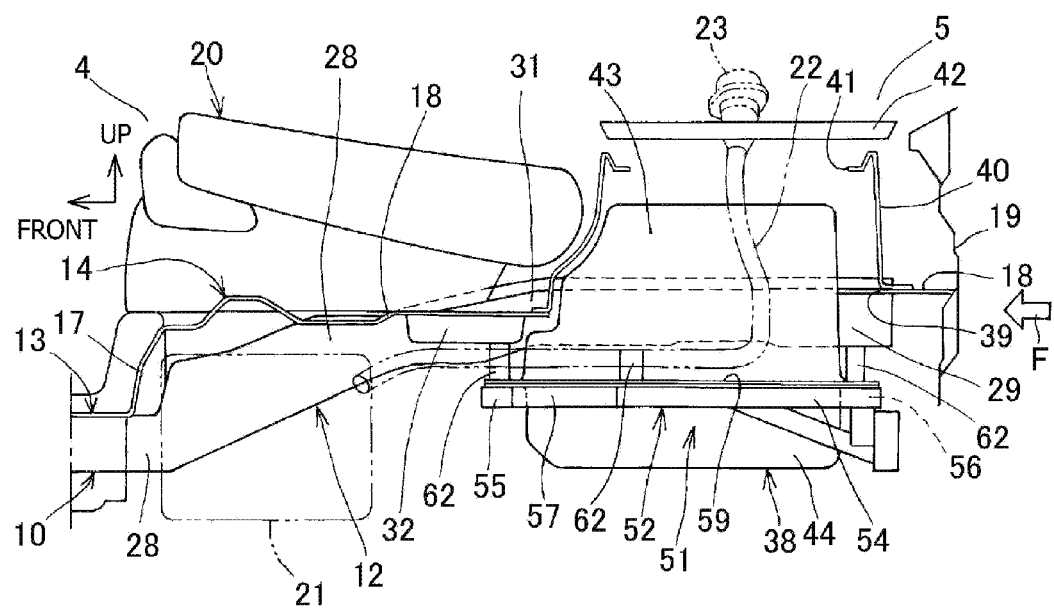
FIG. 3 is a left side view of the vehicle rear portion of the electric car (embodiment)

An engine 15 that drives a power generator is arranged in the engine compartment 3. The front floor panel 13 is formed in a substantially flat shape, and a front seat 16 is arranged in the vehicle interior 4 at the upper portion. The rear floor panel 14 is composed of a vertical wall portion 17 that rises upward from a rear end of the front floor panel 13, and a horizontal wall portion 18 that extends to the vehicle rear side from an upper end of the vertical wall portion 17 as shown in FIG. 3. A rear end of the horizontal wall portion 18 is attached to a rear panel 19 of the vehicle body 2. In the horizontal wall portion 18, a rear seat 20 is arranged at a front-side upper portion, and a fuel tank 21 that stores fuel of the engine 15 is arranged at a front-side lower portion. The trunk 5 is formed at an upper portion of the horizontal wall portion 18 between the rear seat 20 and the rear panel 19.

A filler pipe 22 that extends to a vehicle-widthwise outer side from the lower side of the rear side member 12 on the left side is coupled to the fuel tank 21. A filler cap 23 is removably attached to a distal end of the filler pipe 22.

In the electric car 1, the pair of rear side members 11 and 12 that extend in the vehicle longitudinal direction are arranged at the both vehicle-widthwise side portions at the rear portion of the vehicle body 2 as shown in FIG. 2. The rear side member 11 on the right side includes a front portion 24, a rear portion 25 that is arranged at a position above and backward of the front portion 24, and a rising portion 26 that connects the front portion 24 and the rear portion 25 as shown in FIGS. 2 and 3. A bent portion 27 that connects a rear end of the rising portion 26 and a front end of the rear portion 25 is provided at an intermediate portion of the right rear side member 11. The left rear side member 12 includes a front portion 28, a rear portion 29 that is arranged at a position above and backward of the front portion 28, and a rising portion 30 that connects the front portion 28 and the rear portion 29 as shown in FIG. 2. A bent portion 31 that connects a rear end of the rising portion 30 and a front end of the rear portion 29 is provided at an intermediate portion of the left rear side member 12.

The intermediate portions of the respective rear side members 11 and 12 are coupled to each other by a cross member 32 that extends in the vehicle width direction as shown in FIG. 3. One end of the cross member 32 is arranged at a position below an upper-side edge portion of the bent portion 27 that connects the rising portion 26 and the rear portion 25 of the right rear side member 11, and the other end of the cross member 32 is arranged at a position below an upper-side edge portion of the bent portion 31 that connects the rising portion 30 and the rear portion 29 of the left rear side member 12. An intermediate portion of the horizontal wall portion 18 of the above rear floor panel 14 is attached to the cross member 32. The above fuel tank 21 is arranged below the horizontal wall portion 18 of the rear floor panel 14 on the front side from the cross member 32.

In the electric car 1, suspension arms 33 and 34 that respectively extend in the vehicle longitudinal direction are also arranged on the lower side of the rising portions 26 and 30 of the respective rear side members 11 and 12 as shown in FIG. 2. Intermediate portions of the respective suspension arms 33 and 34 are coupled together by a suspension beam 35 on the lower side of the cross member 32, and the respective suspension arms 33 and 34 are supported by fulcrums 36 and 37 at front ends on the lower side of the rising portions 26 and 30. Accordingly, the respective suspension arms 33 and 34 are integrated by the suspension beam 35, and are supported by the rising portions 26 and 30 so as to be vertically rotatable on rear end sides around the fulcrums 36 and 37.

In the electric car 1, a battery pack 38 is arranged at the rear portion of the vehicle body 2 as shown in FIGS. 2 and 3. The fuel tank 21 is arranged in front of the battery pack 38. The battery pack 38 is charged by the power generator driven by the engine 15. An insertion hole 39 through which the battery pack 38 is inserted from the lower side is formed in the horizontal wall portion 18 of the rear floor panel 14 that forms the trunk 5 on the rear side from the cross member 32. A rolled cover panel 40 that surrounds the insertion hole 39 is attached to the upper side of the horizontal wall portion 18. A service lid 42 is removably attached to an opening 41 of the cover panel 40 at an upper end.

Figure 4:
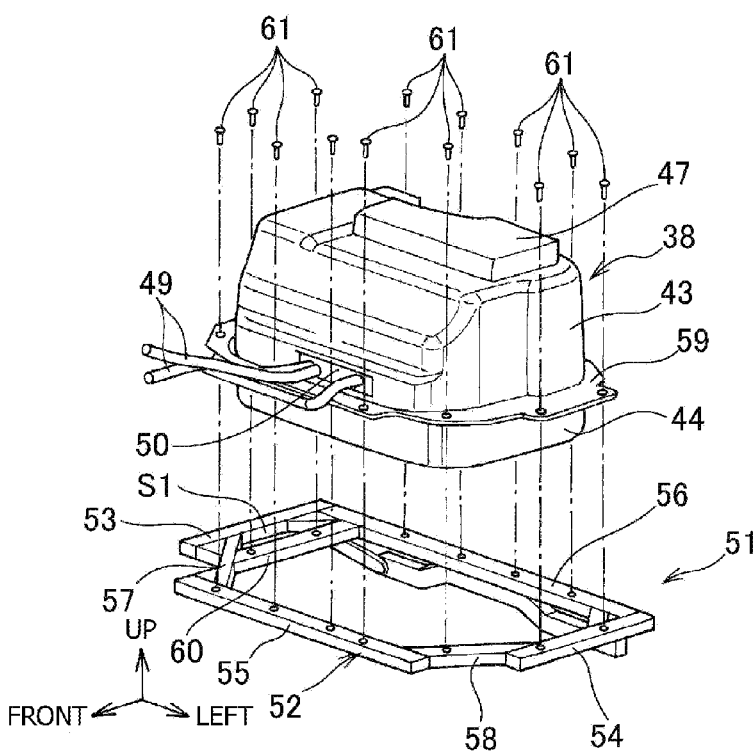
FIG. 4 is an assembly perspective view of a battery pack and a sub-frame (embodiment)
Figure 5:
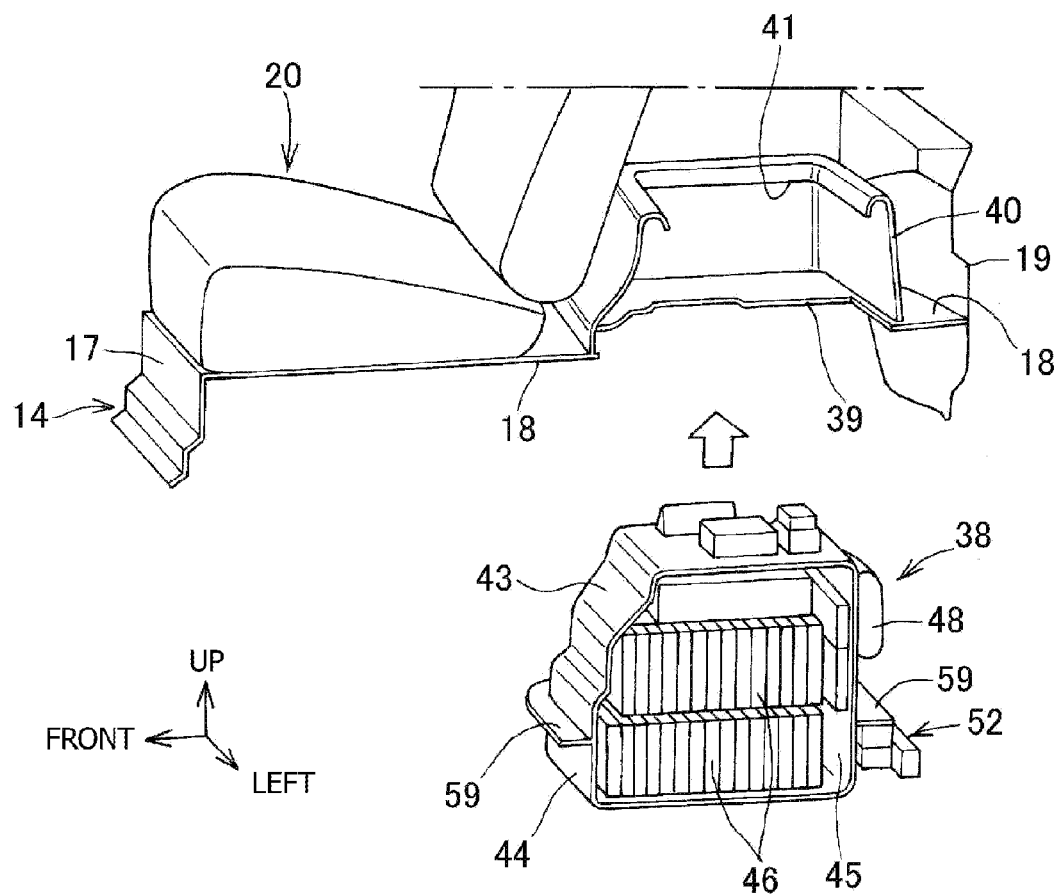
FIG. 5 is a sectional perspective view of the vehicle rear portion of the electric car (embodiment).

The battery pack 38 forms a storage space 45 therein by coupling a lower end of an upper cover 43 having a top-closed and bottom-opened square pillar shape, which is to be inserted through the insertion hole 39, and an upper end of a lower cover 44 having a top-opened and bottom-closed square pillar shape, and stores a plurality of batteries 46 therein as shown in FIGS. 4 and 5. In the upper cover 43, an air cleaner 47 is arranged at a top portion, an exhaust duct 48 is arranged at a rear portion, and a removal hole 50 from which a power line 49 is removed is provided at a front portion. The battery pack 38 is mounted on the vehicle body 2 by a sub-frame 51 that is coupled to the respective rear side members 11 and 12 and the cross member 32.

The sub-frame 51 includes a ring-like support frame 52 that extends in a horizontal direction and surrounds an outer periphery of the battery pack 38. The support frame 52 includes a pair of side member portions 53 and 54 that extend in directions along the respective rear side members 11 and 12, and a front member portion 55 and a rear member portion 56 that extend in the vehicle width direction. The front member portion 55 has a pair of corner portions 57 and 58 that extend diagonally backward at both ends. The support frame 52 extends in the horizontal direction in side view and is formed in a substantially-trapezoidal square frame shape in plan view by coupling the corner portions 57 and 58 at both ends of the front member portion 55 to front ends of the pair of side member portions 53 and 54, and coupling both ends of the rear member portion 56 to rear ends of the pair of side member portions 53 and 54.

The battery pack 38 includes a flange portion 59 that surrounds a portion coupling the upper cover 43 and the lower cover 44 of the battery pack 38 in a ring-like shape, and that is coupled to the support frame 52 of the sub-frame 51. The battery pack 38 is arranged at an offset position toward one side of the pair of side member portions 53 and 54 in the vehicle width direction on the inner side of the support frame 52. In the embodiment, the battery pack 38 is arranged at an offset position toward the left side member portion 54 as shown in FIG. 2. In the support frame 52, a bracket 60 that couples the front member portion 55 and the rear member portion 56 is arranged in a space S1 that is formed on the other side of the pair of side member portions 53 and 54 on the inner side of the support frame 52 by offsetting the battery pack 38. In the embodiment, the bracket 60 that couples the corner portion 57 of the front member portion 55 and the rear member portion 56 is arranged in the space S1 along the right side member portion 53.

The flange portion 59 of the battery pack 38 is brought into abutment against the bracket 60 along the right side member portion 53, the left side member portion 54, the front member portion 55, and the rear member portion 56 by inserting the lower cover 44 into the support frame 52 from above as shown in FIG. 4. The flange portion 59 is coupled to the bracket 60, the left side member portion 54, the front member portion 55, and the rear member portion 56 by attachment bolts 61.

The battery pack 38 coupled to the support frame 52 is arranged in a space within the cover panel 40 by inserting the upper cover 43 through the insertion hole 39 formed in the horizontal wall portion 18 from the lower side of the rear floor panel 14 as shown in FIG. 5, so that the front member portion 55 as a front side portion and the pair of side member portions 53 and 54 as both vehicle-widthwise side portions of the support frame 52 are respectively brought into abutment against the rear portions 25 and 29 of the respective rear side members 11 and 12, and the cross member 32.

In this state, the front member portion 55 as the front side portion and the pair of side member portions 53 and 54 as the both vehicle-widthwise side portions of the support frame 52 are respectively coupled to the cross member 32 and the rear portions 25 and 29 of the respective rear side members 11 and 12 by coupling portions 62 as shown in FIGS. 2 and 3. Accordingly, the battery pack 38 is mounted on the vehicle body 2 by the sub-frame 51 coupled to the rear portions 25 and 29 of the respective rear side members 11 and 12 and the cross member 32.

As described above, the sub-frame 51 for mounting the battery pack 38 on the vehicle body 2 includes the ring-like support frame 52 that extends in the horizontal direction and surrounds the outer periphery of the battery pack 38. Thus, since the sub-frame 51 does not include a vertical bent portion, the sub-frame 51 can be formed into such a shape that is difficult to bend in the vehicle vertical direction and is difficult to compress in the vehicle-longitudinal length when an impact force is applied to the sub-frame 51 in the vehicle longitudinal direction.

Since the front member portion 55 as the front side portion of the support frame 52 is coupled to the cross member 32 by the coupling portions 62, the sub-frame 51 transmits a forward force acting on the support frame 52 to the cross member 32 arranged at a position below the upper-side edge portions of the bent portions 27 and 31 that connect the rising portions 26 and 30 and the rear portions 25 and 29 of the rear side members 11 and 12, and can thereby suppress deformation of the rear side members 11 and 12 at the bent portions 27 and 31 when an impact force F is applied from the vehicle rear side as shown in FIG. 3.

Also, in the sub-frame 51, since the pair of side member portions 53 and 54 as the both vehicle-widthwise side portions of the support frame 52 are coupled to the rear portions 25 and 29 of the rear side members 11 and 12 by the coupling portions 62, the rear side members 11 and 12 can be reinforced by the support frame 52, and the rear side members 11 and 12 can be thereby prevented from being bent in the vehicle vertical direction when receiving a force in the vehicle longitudinal direction.

Thus, the rear side members 11 and 12 are deformed at the bent portions 27 and 31 that connect the rising portions 26 and 30 and the rear portions 25 and 29 in the event of a vehicle rear impact, so that the battery pack 38 can be prevented from colliding with an in-vehicle part such as the rear seat 20 arranged in front thereof.

Therefore, in the present invention, the battery pack 38 can be protected in the event of a vehicle rear impact in the electric car 1 in which the battery pack 38 is arranged between the rear side members 11 and 12 arranged at the vehicle rear portion.

The battery pack 38 includes the flange portion 59 that surrounds the battery pack 38 in a ring-like shape and that is coupled to the support frame 52 of the sub-frame 51.

As described above, since the battery pack 38 can be directly coupled to the support frame 52 of the sub-frame 51 due to the structure with the flange portion 59 coupled to the support frame 52, the heavy battery pack 38 can be prevented from moving forward relative to the support frame 52 to collide therewith in the event of a vehicle rear impact.

The support frame 52 of the sub-frame 51 includes the pair of side member portions 53 and 54, the front member portion 55, and the rear member portion 56 as shown in FIG. 4. The battery pack 38 is also arranged at an offset position toward the left side member portion 54 out of the pair of side member portions 53 and 54 in the vehicle width direction on the inner side of the support frame 52. By offsetting the battery pack 38, the space S1 is formed on the right side member portion 53 side out of the pair of side member portions 53 and 54 on the inner side of the support frame 52. The bracket 60 that couples the front member portion 55 and the rear member portion 56 is arranged in the space S1.

As described above, by arranging the battery pack 38 at an offset position toward one side (the left side in FIG. 2) in the vehicle width direction on the inner side of the support frame 52, the space S1 is formed on the other side (the right side in FIG. 2) in the vehicle width direction of the battery pack 38, so that an exhaust pipe 63 or the like coupled to the engine 15 that drives the power generator can be arranged in the space S1.

At this point, the bracket 60 that couples the front member portion 55 and the rear member portion 56 is arranged in the space S1 formed on the inner side of the support frame 52 by offsetting the battery pack 38, so that the support frame 52 is reinforced by the bracket 60 to thereby obtain such a structure that is difficult to deform by an impact force in the vehicle longitudinal direction.

The filler pipe 22 that extends to the vehicle-widthwise outer side from the rear side members 11 and 12 is coupled to the fuel tank 21 arranged in front of the battery pack 38 as shown in FIG. 3. The filler pipe 22 extends to the vehicle-widthwise outer side from the left rear side member 12 through a space S2 sandwiched between the rear portion 29 of the left rear side member 12 and the left side member portion 54 of the support frame 52 in the vehicle vertical direction as shown in FIG. 1.

As described above, in the case of the electric car 1 on which the fuel tank 21 is mounted in addition to the battery pack 38, the filler pipe 22 coupled to the fuel tank 21 is arranged in the space S2 that is prevented from being deformed in the event of a vehicle rear impact by the support frame 52 of the sub-frame 51, so that the filler pipe 22 can be protected from collision with other parts.

The present invention is to protect the battery pack in the event of a vehicle rear impact in the electric car in which the battery pack is arranged between the rear side members arranged at the vehicle rear portion, and can be also applied to a vehicle in which a vehicle part required to be protected from an impact force in the event of a vehicle rear impact is arranged in addition to the battery pack.

What is claimed is:

1. A battery pack mounting structure for electric cars, comprising:
   a pair of rear side members extending in a vehicle longitudinal direction and having a front portion, a rear portion that is arranged at a position above the front portion, and a rising portion that connects both portions are arranged at both vehicle-widthwise side portions, intermediate portions of the respective rear side members are coupled to each other by a cross member that extends in a vehicle width direction, and a battery pack is mounted on a vehicle body by a sub-frame that is coupled to the respective rear side members and the cross member, wherein the cross member is arranged at a position below an upper edge portion of a bent portion that connects the rising portion and the rear portion of each of the rear side members, the sub-frame includes a ring-like support frame that extends in a horizontal direction in vehicle side view and surrounds an outer periphery of the battery pack in vehicle plan view, the support frame being arranged on the vehicle lower side with respect to the rear portion of the rear side member, and a front side portion and both vehicle-widthwise side portions of the support frame are respectively coupled to the cross member and the rear portions of the respective rear side members by coupling portions, wherein the battery pack includes a flange portion that surrounds the battery pack in a ring-like shape, and that is coupled to the support frame of the sub-frame.

2. The battery pack mounting structure for electric cars according to claim 1, wherein the support frame includes a pair of side member portions that extend in directions along the respective rear side members, and a front member portion and a rear member portion that extend in the vehicle width direction, the battery pack is arranged at an offset position toward one side of the pair of side member portions in the vehicle width direction on an inner side of the support frame, and a bracket that couples the front member portion and the rear member portion is arranged in a space that is formed on the other side of the pair of side member portions on the inner side of the support frame by offsetting the battery pack.

* * * * *